(12) United States Patent
Cumeralto et al.

(10) Patent No.: US 9,480,033 B2
(45) Date of Patent: Oct. 25, 2016

(54) MANAGING OVERLAPPING MESSAGES IN A NETWORK ENVIRONMENT

(71) Applicant: Itron, Inc., Liberty Lake, WA (US)

(72) Inventors: Scott L. Cumeralto, Spokane Valley, WA (US); Richard Nolan DeVries, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 65 days.

(21) Appl. No.: 14/398,945

(22) PCT Filed: Mar. 15, 2013

(86) PCT No.: PCT/US2013/032329
§ 371 (c)(1),
(2) Date: Nov. 4, 2014

(87) PCT Pub. No.: WO2013/165611
PCT Pub. Date: Nov. 7, 2013

(65) Prior Publication Data
US 2015/0139218 A1    May 21, 2015

(30) Foreign Application Priority Data
May 4, 2012   (EP) .................................... 12166878

(51) Int. Cl.
*H04W 56/00*   (2009.01)
*H04L 1/20*    (2006.01)
*H04W 24/08*   (2009.01)

(52) U.S. Cl.
CPC ............. *H04W 56/001* (2013.01); *H04L 1/20* (2013.01); *H04W 24/08* (2013.01)

(58) Field of Classification Search
None
See application file for complete search history.

(56) References Cited

U.S. PATENT DOCUMENTS

| | | |
|---|---|---|
| 6,185,640 B1 | 2/2001 | Ross |
| 6,272,117 B1 | 8/2001 | Choi et al. |
| 6,690,719 B1 | 2/2004 | Raphaeli et al. |
| 6,865,240 B1 * | 3/2005 | Kawataka ............... H04L 7/048 370/511 |
| 6,909,755 B2 | 6/2005 | Erving |
| 2009/0213815 A1 * | 8/2009 | Sherman ........... H04W 74/0841 370/336 |
| 2012/0163815 A1 * | 6/2012 | Mori .................. H04Q 11/0005 398/51 |

FOREIGN PATENT DOCUMENTS

EP    1519518    3/2005

OTHER PUBLICATIONS

Extended European Search Report mailed Oct. 22, 2012 for European patent application No. 12166878.4, 16 pages.
Partial European Search Report mailed Jul. 5, 2012 for European patent application No. 12166878.4, 9 pages.
(Continued)

*Primary Examiner* — Gary Mui
(74) *Attorney, Agent, or Firm* — Lee & Hayes, PLLC (57) ABSTRACT

A system and method manages a stream of data to receive a data packet among a set of potentially colliding data packets. The stream of data is monitored with a first detector level to recognize a potential first data packet having a bit sequence that matches a known bit sequence. In response to a recognition of a potential first data packet by the first detector level, the stream of data is monitored with a second detector level to recognize a potential second data packet having a bit sequence that matches a known bit sequence while the first detector level is engaged with the potential first data packet.

20 Claims, 5 Drawing Sheets

(56) References Cited

OTHER PUBLICATIONS

Gollakota, et al., "ZigZag Decoding: Combating Hidden Terminals in Wireless Networks", Proceedings of the ACM SIGCOMM 2008 Conference on Data Communication, Aug. 17, 2008, ACM New York, NY, USA, pp. 159-170, retrieved from the internet at http://delivery.acm.org/10.1145/1410000/1402977/p159-gollakota.pdf?ip=145.64.134.241&acc=PUBLIC&CFID=90873155&CFTOKEN=66216126&__acm__=1340367431_86e04fe628d5293b879454109623d17a, retrieved on Jun. 18, 2012.

PCT Search Report mailed Jul. 26, 2013 for PCT application No. PCT/US13/32329, 10 pages.

Rahman, et al., "An Iteratvie ZigZag Decoding for Combating Collisions in Wireless Networks", IEEE Communications Letters, IEEE Service Center, Piscataway, NY, USA, vol. 14, No. 3, Mar. 1, 2012, pp. 242-244.

Raphaeli, et al., "A New Power-Line-Communications Modem based on a Novel Modulations Technique", ISPLC 2000, Oct. 8, 2008, pp. 282-288, retrieved from the internat at http://www.isplc.org/docsearch/Proceedings/2000/pdf/0633_001.pdf, retrieved on Jun. 18, 2012.

\* cited by examiner

MANAGING OVERLAPPING MESSAGES IN A NETWORK ENVIRONMENT

CROSS REFERENCE TO RELATED APPLICATIONS

This application is a continuation of, and claims priority to, PCT Patent Application No. PCT/US13/32329, filed Mar. 15, 2013, and entitled "Managing Overlapping Messages in a Network Environment," and also is a continuation of, and claims priority to, European Patent Application No. EP 12166878.4, filed May 4, 2012, and entitled "Managing Overlapping Messages in a Network Environment," both of which are incorporated herein by reference.

BACKGROUND

Communication systems in which a common channel or frequency is shared among multiple transmitters are degraded by collisions in which a receiver is concurrently presented with two or more messages from two or more different transmitters. Data collisions present a contention problem that is prevalent in systems in which there is little or no channel arbitration, and can even occur in arbitrated systems or systems utilizing a network control protocol. In an example involving automatic (utility) meter reading (AMR) systems, a central data gathering transceiver receives utility consumption and related information transmitted by a plurality of utility meter endpoints that originate the utility consumption and related information and transmit it to a data gathering transceiver. Typically, the remote transceivers transmit without concern for existing traffic in the communication channel. For example, each remote transceiver can operate in an ALOHA-type mode of operation in which it transmits data without regard to whether other transmitters may be broadcasting.

A capture effect problem is typically experienced in a shared medium system when a weak RF signal is preempted by a stronger RF signal resulting in the receiver tracking the stronger signal. This capture effect can result in loss of the original data packet as the weaker signal is overridden by the later arriving but stronger second signal. Information transmitted by the second signal is typically also lost in this scenario because the weaker first message had not been properly terminated.

The loss of data as a result of such collisions substantially reduces the information transfer performance in the communication channel. As the number of transmitters (and transmissions per unit time) increase, so too does the incidence of collisions. The overall effect inhibits the number and duration of transmissions that can be accommodated by the communication channel. In addition, collision management typically requires re-transmission of data, which further clutters the communication channel and consumes additional energy in the transmitters. If the installed transmitters are battery-powered, their useful life is reduced.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 2 is a diagram illustrating a data packet having a preamble with a synchronization pattern, a packet body with a message portion, and a validation portion that may include an error-detecting code, such as a cyclical redundancy check (CRC) or similar.

DETAILED DESCRIPTION

Overview

Representative examples of the management of overlapping messages in a network environment are discussed herein. In one example, systems and methods for monitoring a communication channel to receive possibly overlapping (i.e., concurrently transmitted) data packets in a radio frequency (RF) network environment are discussed. Each data packet may include a preamble having a packet synchronization pattern, a packet body including a message portion, and a validation portion that may include an error-detecting code, such as a cyclical redundancy check (CRC) or similar. A method of the management of overlapping messages may include monitoring the communication channel to detect a preamble of a first packet having a known synchronization pattern. In response to detection and recognition of the synchronization pattern, data assumed to be associated with the first packet is received over the communication channel and buffered. When reception of the first packet is complete (e.g., as indicated by a packet length related to a protocol indicated by the synchronization pattern), the validation of the first packet is confirmed, such as by verification of a CRC. Meanwhile, as data assumed to be associated with the first packet is being received and buffered, the communication channel is monitored to detect a preamble of a second packet. Such a packet could be concurrently transmitted, and could interfere with reception of the first packet. For example, the second packet could have a stronger signal than the first packet, which may override reception of the first packet. Thus, the preamble and other portions of the second packet could have been assumed to be part of the first packet, and included in the buffer of the first packet. In the event that a preamble of a second packet is recognized, data assumed to be associated with the second packet is received, buffered and then verified (e.g., by CRC). Additionally, the communication channel is monitored to detect a preamble of a third packet.

Thus, once a synchronization pattern in a preamble of a packet is recognized, subsequent data is buffered and the CRC is used to confirm receipt of the packet. However, since the buffered data may actually be part of a second packet transmitted by an interfering RF signal, the data is also checked for a synchronization pattern. If a second synchronization pattern is detected, then a second packet is present, and subsequent data is buffered and the CRC is used to confirm receipt of that packet. This process may be repeated if further packets interrupt receipt of the second packet.

The discussion herein includes several sections. Each section is intended to be a non-limiting example of techniques and/or structures, but is not intended to indicate elements that must be used and/or performed. More particularly, this entire description is intended to illustrate components which may be utilized to manage overlapping messages in a network environment, but not components which are necessarily required. The discussion begins with a section entitled "Example Receiver and Packet Configurations," which describes one environment implementing the techniques described herein. This section depicts and describes a receiver at a high-level architecture. Next, a section entitled "Example Detector Configuration" illustrates and describes an example of a nested synchronization pattern detector configured to manage overlapping messages in a network environment. A section entitled "Example Methods" discusses aspects of methods operational in devices including processors, memory devices, application specific integrated circuits (ASICs), gate arrays and other hardware devices, etc. In particular, the example methods may be applied to any of the techniques discussed herein. Next, a section entitled "Example Detector Operation" illustrates and describes example methods of operation of a nested synchronization detector configured to manage overlapping messages in a network environment. Next, a section entitled "Example Detector Timing" illustrates and describes example timing issues in the management of overlapping messages. Next, a section entitled "Example Methods of Message Management" illustrates and describes examples of management of overlapping messages in a network environment. Finally, the discussion ends with a brief conclusion. This brief introduction is provided for the reader's convenience and is not intended to describe and/or limit the scope of the claims or any section of this disclosure.

Example Receiver and Packet Configurations

Figure 1:
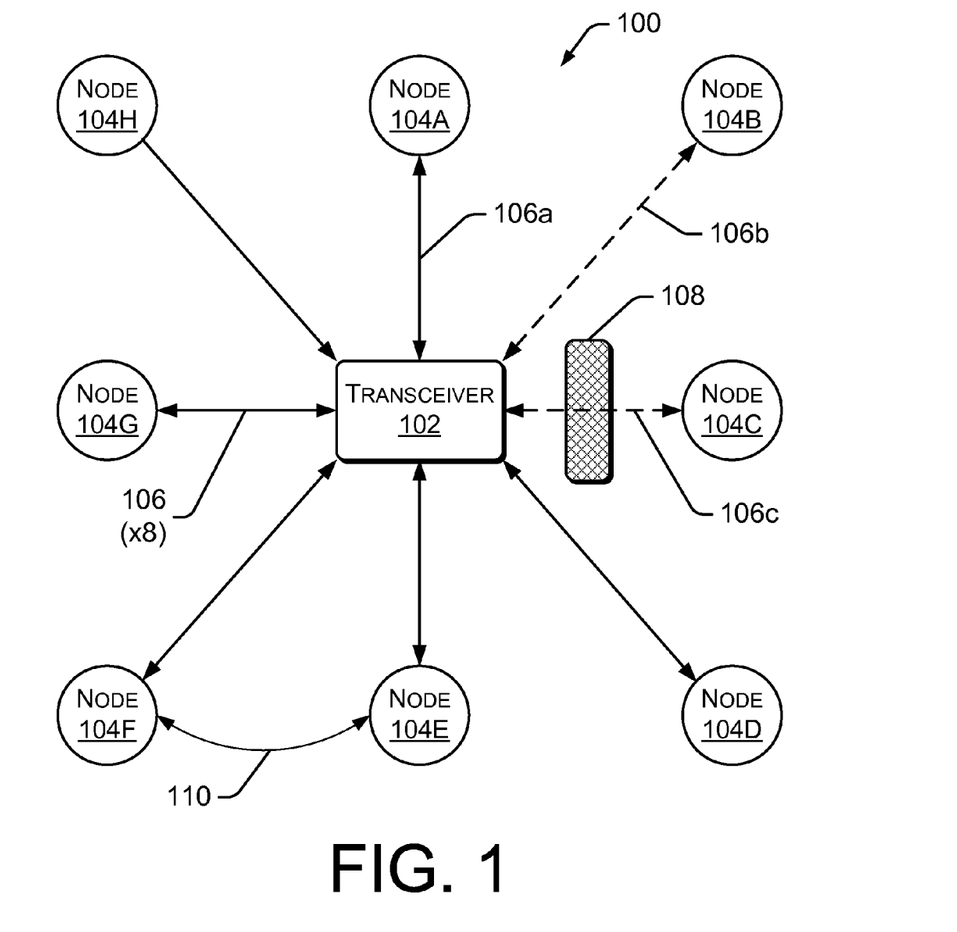
FIG. 1 is a diagram illustrating a radio frequency (RF) communication system configured for managing overlapping messages in a network environment.

FIG. 1 is a diagram illustrating an example communication system 100 configured to manage overlapping messages in a network environment. The example communication system 100 includes a central receiver or transceiver 102 and a plurality of transmitters, transceivers or nodes 104a-104h (collectively referred to as nodes or transceivers 104). In one example, the central transceiver 102 may be confronted with two or more overlapping messages (i.e., for at least a period of time, both messages are being received), which are managed to allow reception and use of at least one of the messages. The central transceiver 102 and transceivers 104 communicate with one another over a common communication channel. The common communication channel can be a same wireless or RF frequency or a wired medium. A wired medium may include dedicated wiring, or may include power line communication (PLC), i.e., a signal superimposed over an alternating current (AC) power distribution line. One characteristic of this type of communication channel is the possibility of colliding transmissions. For example, two packets of data may be received by a same receiver during overlapping periods of time. The transceiver 102 employs the techniques discussed herein to receive at least one of the data packets.

One example of the communication system 100 is an automatic meter reading (AMR) system, in which central data gathering transceiver 102 receives utility consumption and related information transmitted by a plurality of utility meter endpoints or nodes 104 that originate the utility consumption and related information and transmit it to the data gathering transceiver 102. In one example, nodes 104 communicate in a mode in which they are unconcerned with any existing traffic in the communication channel when transmitting. This may be the case, at least in part, because nodes 104 may be transmitters, but not receivers. In another example, each node 104 can operate in an ALOHA-type mode of operation in which it transmits data without regard to when other transmitters may be broadcasting.

In FIG. 1, transmissions between central transceiver 102 and each of the transceivers 104 are indicated as transmissions 106. A transmission 106 can originate at a remote transceiver 104 to be transmitted for reception by central transceiver 102, or may originate at central transceiver 102 for reception by one or more transceivers 104. Communication system 100 can also include transceivers (e.g., transceiver 104H) that are transmit-only devices. Likewise, in a related system, a central transceiver can be a receive-only device. It is also possible for transceivers 104 to communicate with one another directly, as exemplified by transmission 110.

Particularly in an RF example, transmissions 106 can have different characteristics based on the relative configuration of the pair of communicating transceivers or on the occurrence of events that can affect propagation of the communication signals. For example, transmission 106a is between central transceiver 102 and remote transceiver 104a that is located relatively nearby. Transmission 106a can have relatively higher signal strength as a result than some other transmissions. On the other hand, transmission 106b between central transceiver 102 and remote transceiver 104b that is located relatively further away from central transceiver 102 will tend to have a weaker signal strength. If transmissions 106a and 106b occur at around the same time such that they overlap at least partially, transmission 106a would tend to dominate the communication channel (from the perspective of transceiver 102). Transmission 106c between central transceiver 102 and 104c illustrates another example of how a transmission can be attenuated. A barrier 108 results in attenuation of transmission 106c. In different examples, barrier 108 can be a permanent feature of the landscape between the communicating transceiver, or it can represent a temporary condition.

Figure 2:
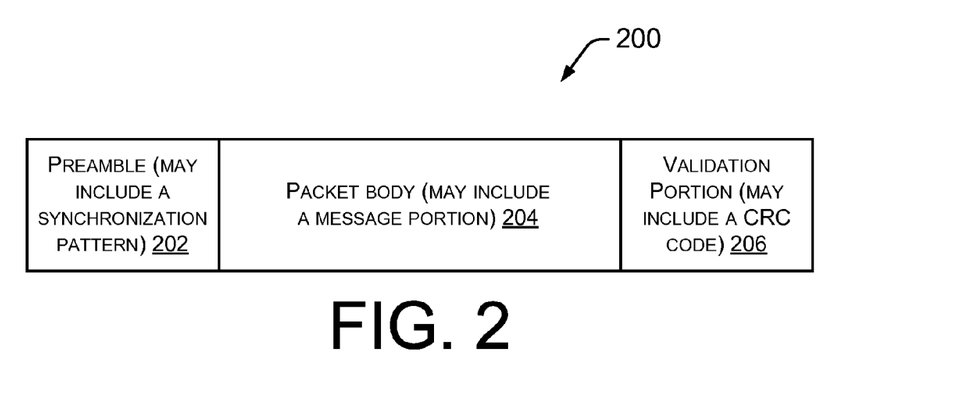

Communication system 100 may be a digital communication system utilizing a data exchange protocol in which data is transmitted in packets. FIG. 2 illustrates an example of a data packet 200. Data packet 200 includes a preamble 202 that contains a bit pattern used by receivers for identifying the start of a packet, the packet type and protocol, and for synchronizing their circuitry and/or software to properly receive and process the entire packet 200. In one example, the preamble may include a packet identification sequence that is at least a portion of the preamble of the packet of digital data 200. Packet 200 further includes a packet body 204 that contains the message portion or payload. Depending on the type of message that is carried by the packet, packet body 204 can have any suitable length. By way of examples, a typical automatic meter reading (AMR) system can include a relatively shorter standard consumption message (SCM), a relatively longer but less frequently transmitted interval data message (IDM), and a command (CMD) message of a defined length. Based on the message type, preamble 202 has a corresponding synchronization bit pattern.

When a receiver detects a known synchronization bit pattern, the receiver will be able to know the length of the message (i.e. the number of bits) to receive, for example, by either looking up the length corresponding to each known synchronization bit pattern or by deriving the length formulaically based on the synchronization bit pattern. This is equivalent to the receiver knowing the duration of time it needs to conduct sampling of the communication channel.

Following the packet body, packet 200 includes a packet validating portion 206. The packet validating portion may support a verification technique. Any desired verification technique may be used, such as an error-detection technique, a CRC, or the like. Accordingly, the validating portion 206 may contain parity bits or other information to support the error-detection technique, the CRC, or the like, which the receiver may use to verify receipt of a valid packet.

Example Detector Configuration

Figure 3:
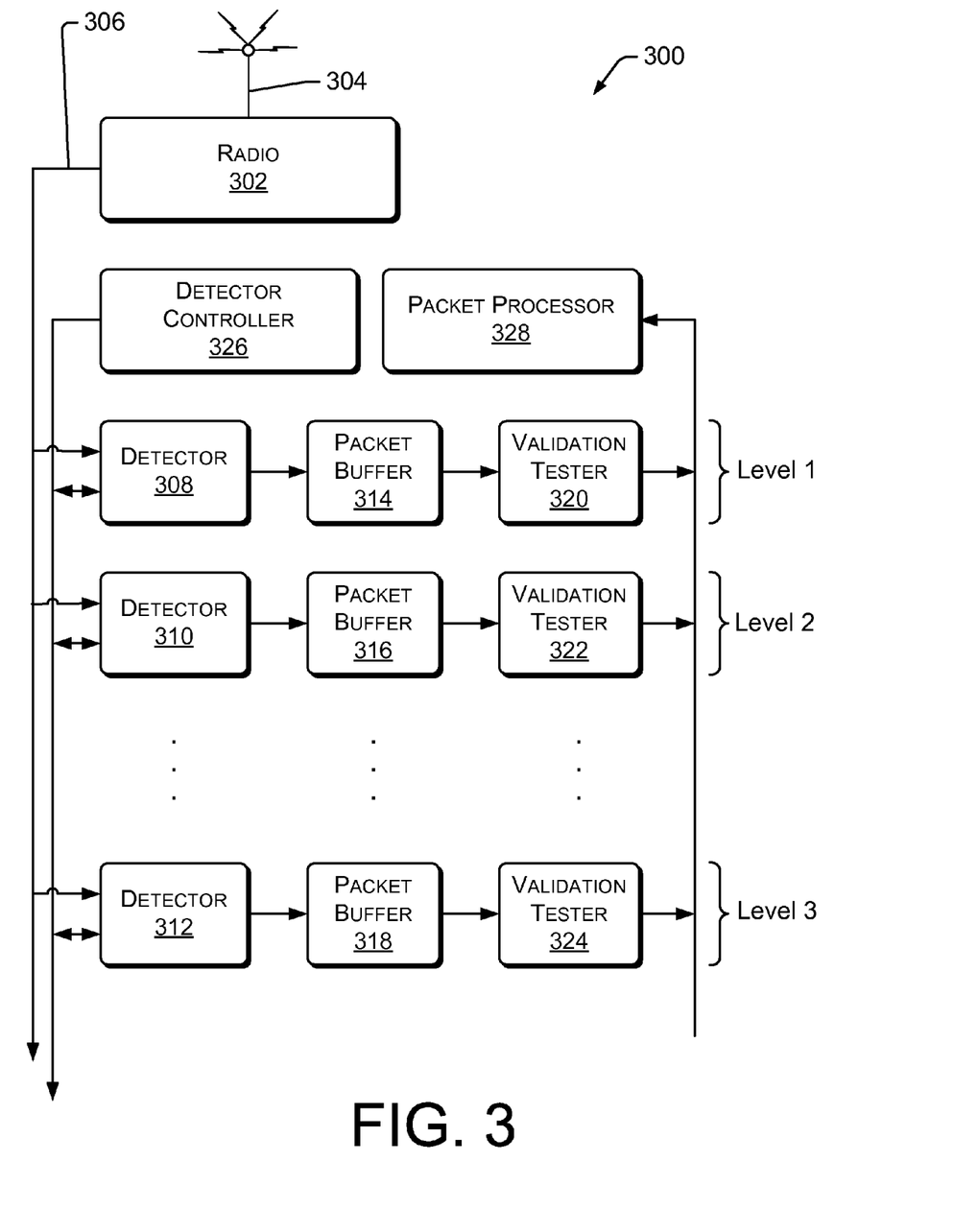
FIG. 3 is a block diagram illustrating an example receiver system according to one embodiment of the invention.

FIG. 3 is a block diagram illustrating an example receiver system 300 (e.g., part of the transceiver 102 of FIG. 1), which is capable of recognizing and distinguishing overlapping data packet transmissions, and successfully receiving at least one of the overlapping transmissions. Receiver system 300 includes a radio receiver 302 and antenna 304 for receiving RF transmissions (e.g., RF signal 106, seen in FIG. 1). The RF signal may be configured as a packet (e.g., packet 200, seen in FIG. 2), which may include information that has been encoded, modulated and transmitted. The radio receiver 302 may include processing logic (e.g., a Manchester decoder) to extract information from the RF signal and to produce a resultant digital signal 306. Persons skilled in the art will recognize that a receiver system such as receiver system 300 can be adapted to receive any suitable message-bearing RF signal transmission including, but not limited to, continuous wave modulated signaling, spread spectrum signaling, and base band (un-modulated) signaling. In a related embodiment, the receiver system may be adapted to receive transmissions via a wired medium, such as, for example, coaxial cable, telecommunications line, power lines, fiber-optic cables, etc.

The digital signal 306 may include a stream of serial data and may be presented to a multi-level packet detector, having several levels in the example shown (e.g., Level 1, Level 2 and Level 3). Each level may be thought of as a "channel" or a "pipeline," etc., configured to recognize a synchronization pattern in a preamble of a packet and to process the different portions of the packet. For illustrative purposes, the description of receiver system 300 is limited to three detector levels. However, in related embodiments, receiver system 300 may have two, four or more detector levels. In one example, a Level 1 of the multi-level packet detector monitors data 306 for a synchronization pattern indicating a first packet. Upon recognition of such a pattern, Level 1 buffers and attempts to validate a message portion of the first packet. While Level 1 is buffering the first packet, the Level 2 reviews the same data for a synchronization pattern of a second packet, which may be transmitted in a concurrent manner with the first packet, and which may be overriding the signal of the first packet. If the Level 2 recognizes such a synchronization pattern, then the Level 2 buffers and attempts to validate a message portion of the second packet. While the Level 2 is buffering the second packet, Level 3 reviews the same data for a synchronization pattern of a third packet, which may be transmitted in a concurrent manner with the second packet, and which may be overriding the signal of the second packet. Thus, recognition of a synchronization pattern by one level results in activation of a next or further level in a "nested" manner.

Each detector level (e.g., Levels 1, 2, and 3) may include a detector 308, 310, 312, a packet buffer 314, 316, 318, and a validation tester 320, 322, 324. A detector controller 326 activates components (e.g., synchronization detector 308, packet buffer 314, and validation tester 320) in Level 1 to process an incoming digital signal 306. If Level 1 recognizes a packet, then the detector controller 326 activates components on Level 2 (e.g., the detector 310, buffer 316, and validation tester 322), to determine if a second packet is being received. Receipt of a second packet may interfere with reception of the first packet by the first detector level. For example, the RF signal associated with the second packet may override (and overwrite) the RF signal of the first packet. Such interference may prevent the Level 1 from successfully processing the first packet. However, Level 2 may begin to process the second packet. Because a third packet may override the RF signal of the second packet, the detector controller 326 may activate a subsequent or further level, e.g., Level 3. This "nested" behavior may continue depending on the number of packets received and the number of levels available.

Each (synchronization) detector 308, 310, or 312 operates by examining data 306, and comparing an observed running sequence of incoming data against known packet preamble sequences (e.g., references, or reference preamble sequences). If a known synchronization pattern (e.g., part of the header of a packet) is recognized among recovered data 306, the detector 308 provides an indication to that effect, such as to the detector controller 326. Such an indication may have at least two results. First, because the recognized synchronization pattern indicates that a message portion of the identified packet will arrive, the packet buffer 314 is used to buffer that message portion. Second, because the message portion may be overridden by a further incoming packet, the detector controller 326 activates the detector 310 of Level 2. Thus, each level—and associated synchronization detector 308, 310, 312—is selectively enabled by logic within the detector controller 326. In one example, the detector controller 326 enables a detector in a next detector level upon detection of a synchronization pattern in the preamble of a packet by a detector of a previous level. In another example, the detector controller 326 includes detector enabling logic that enables a second packet identification sequence detector (e.g., detector 310) to monitor the incoming data in response to a detection by the first packet identification sequence detector (e.g., detector 308) of a known packet identification sequence.

After a detector 308, 310, 312 recognizes a synchronization pattern, received data is buffered in a packet buffer 314, 316, 318, respectively. The buffers may store a quantity of data indicated by a protocol associated with the recognized synchronization pattern, including a number of bits belonging to the packet body and the validating portion of a data packet.

During the buffering of what is believed to be the data packet, a validation tester 320, 322 or 324 may calculate an error-detecting code as each bit arrives. When the error-detecting code is fully calculated (e.g., when all relevant bits of the data packet are utilized), the resultant value is compared to a value in the data-validating portion of the packet. Such a comparison may be used to verify that the data received is in fact a valid packet. If the data received does not correspond to a valid packet, the data may be ignored. If the validation test indicates that a valid packet has in fact been received, the packet is processed by packet processor 328. The validation testers 320, 322, 324 may validate the data of the buffered packet by any desired method of error-detection, such as by use of a CRC. Thus, the validation testers 320, 322, 324 may verify the packet, such as by comparison of a calculated value of a CRC to a stored value of the CRC. Conversely, the testers may invalidate the packet if a threshold period of time passes without receipt of a validation portion of the packet or if a validation test of the packet fails.

Packet processor 328 is generally concerned with the message portion of the packet body, which contains the packet's payload. The packet processor 328 reads the packet body, and responds accordingly. In one example, the packet processor 328 processes the message portion of the packet in response to a verification of the message portion by a validation tester 320, 322, 324.

In one embodiment, a Manchester decoder and other portions of the radio 302, detector controller 326, detectors 308, 310, 312, validation testers 320, 322, 324 and/or the packet processor are implemented using hardware logic, such as an application specific integrated circuit (ASIC). In related embodiments, these functions or modules are implemented in software logic, or in a combination of hardware and software, such as in a field programmable gate array (FPGA), for example.

Example Methods

Figure 4:
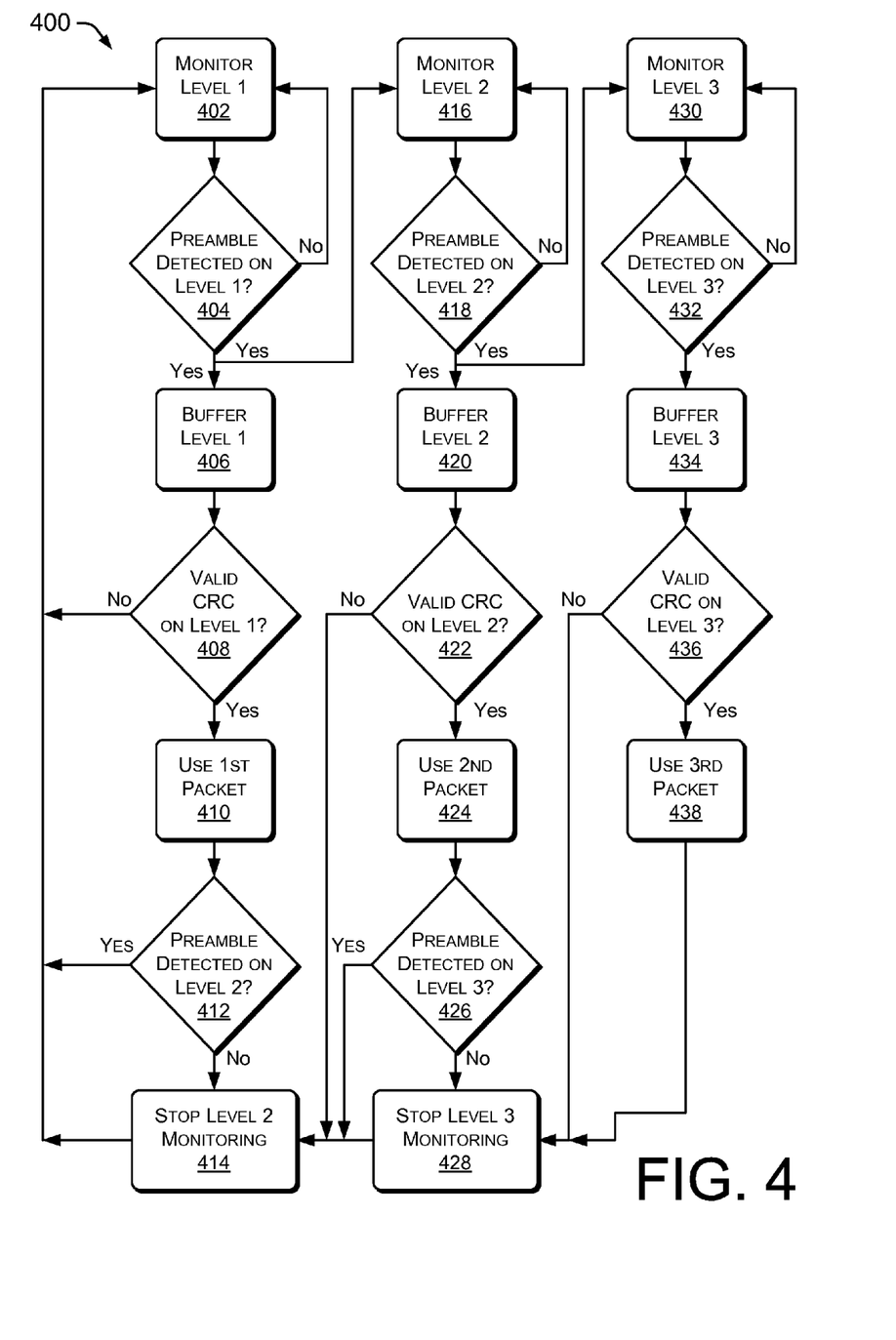
FIG. 4 is a flow diagram illustrating an example operating process for the receiver system of FIG. 3.
Figure 5:
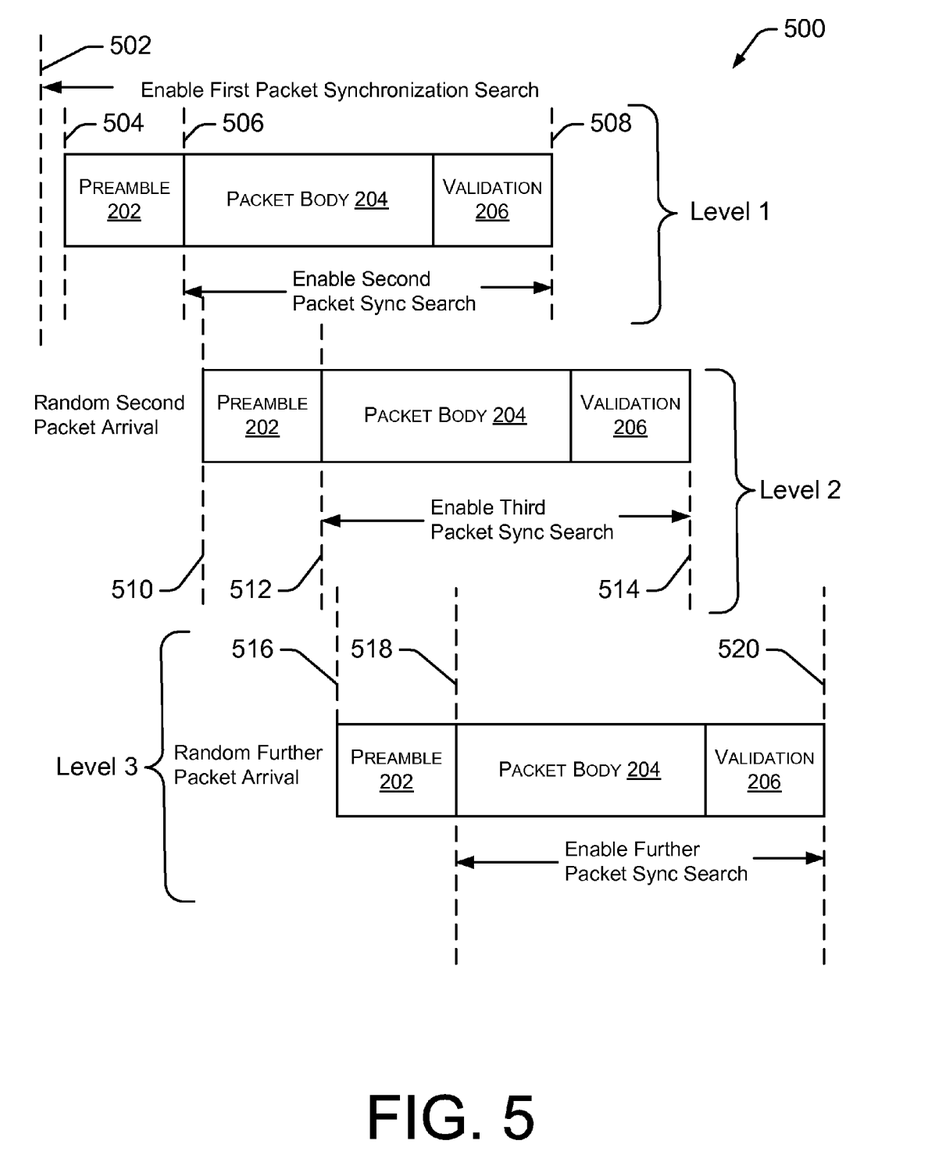
FIG. 5 is a timing diagram illustrating example timing processes for the receiver system of FIG. 3.
Figure 6:
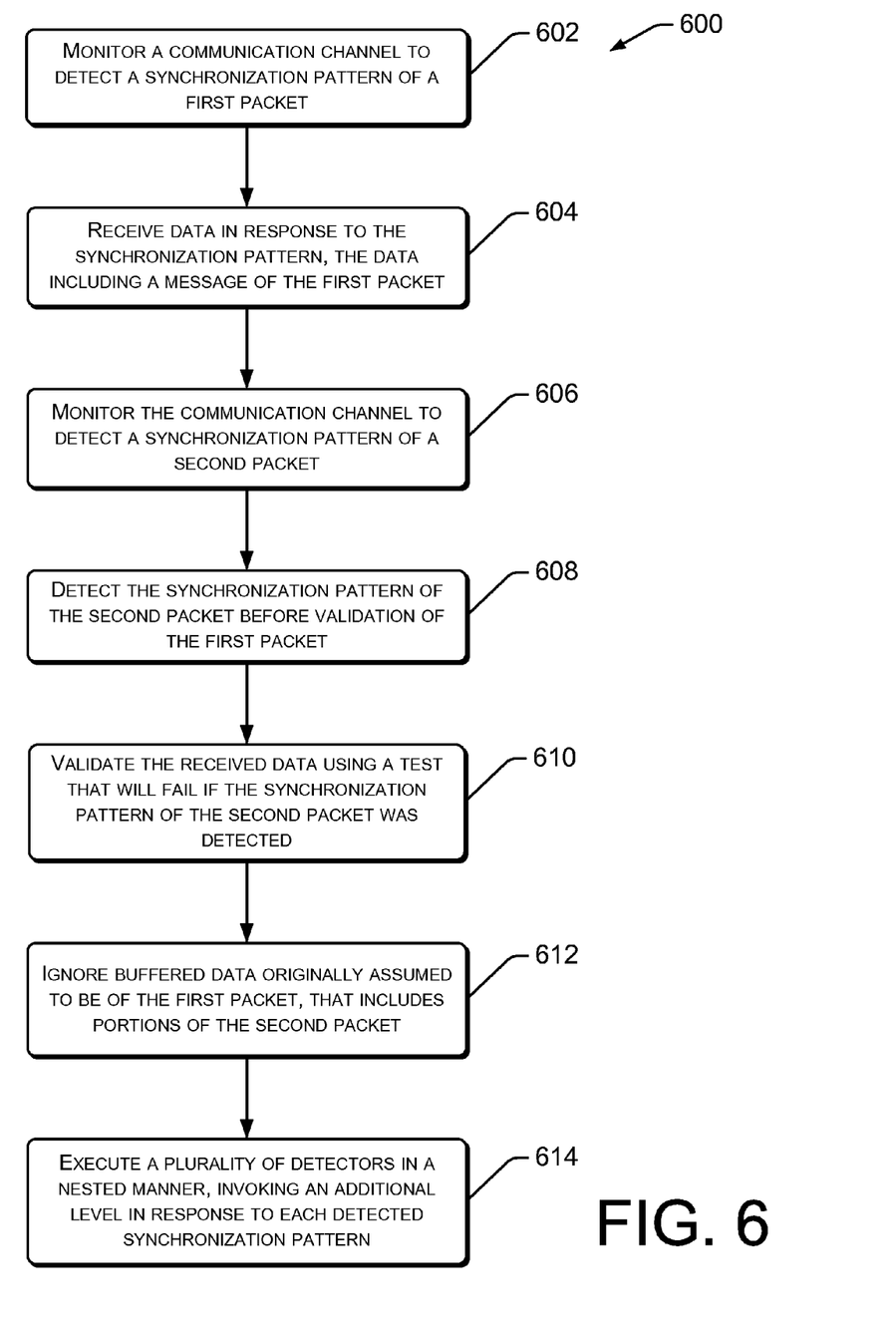
FIG. 6 is an example method for managing overlapping messages in a network environment.

The example methods of FIGS. 4-6 may be implemented by the systems discussed in FIGS. 1-3. However, FIGS. 4-6 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof. Moreover, the software may include computer-readable media on which are defined computer-executable instructions that, when executed by one or more processor(s), perform various functions and/or operations described herein. In the context of software and/or computer-readable media, the operations represent computer-executable instructions stored on one or more computer-readable storage media that, when executed by one or more processors, perform the recited operations. Computer-readable media includes devices that store data and instructions in a non-transitory manner, including random access memory (RAM), read only memory (ROM), and the like. Additionally, the systems and methods may be implemented in hardware, such as by one or more application specific integrated circuits (ASIC), field programmable gate arrays (FPGA), uncommitted logic array (ULA) and/or other hardware device.

Example Detector Operation

FIG. 4 is the flow diagram illustrating example process 400 of operating receiver system 300. At operation 402, detector 308 is enabled (e.g., by the detector controller 326) and begins monitoring the stream of received data 306 for a known preamble or synchronization sequence. This operation may be performed on Level 1. Periodically, such as after each received bit, detector 308 tests all or part of the received data for the presence of any known sequence. In one embodiment, the incoming data is stored in a register, such as in packet buffer 314, or in a dedicated register (not shown).

At operation 404, if a preamble having known synchronization sequence is detected by detector 308 on Level 1, two operations are initiated, including operation 406 and operation 416 (described below). If a known preamble is not detected, the detector 308 returns to operation 402 and continues to monitor incoming data 306 for a known preamble.

At operation 406, in response to recognition of a synchronization pattern and/or preamble of a packet, buffer 314 begins to fill with incoming data 306. Because the preamble was recognized, the incoming data is assumed to be a message portion of a body of a packet associated with the recognized preamble. The amount of data buffered depends on the type of packet that is presumably being received, which, in turn, is based on the received preamble's bit sequence. That is, a recognized synchronization pattern in the preamble of the packet may indicate a protocol and length of a message or body of the packet.

At operation 408, validation tester 320 on Level 1 checks the received data in packet buffer 314 for validity. In one example, a CRC of the buffered data is compared to a value contained in the packet. If the values do not match, the data is corrupted, and can be disregarded or discarded, and the process continues at operation 402. Alternatively, at operation 410, if the validation test indicates a match, then data in packet buffer 314 is processed at packet processor 328.

At operation 412, the system (e.g. controller 326 and/or synchronization detector 310) determines if a further synchronization pattern, indicating arrival of a further packet, has been detected. If not, then at operation 414 the detector 310 is stopped and/or reset. This prevents multiple levels (e.g., Levels 1 and 2) from simultaneously detecting and responding to the same preamble bit sequence in parallel. Thereafter, process 400 continues at step 402.

Operations taking place on, or influenced by, Level 2 are described by operations 416-428. At operation 416, detector 310 is enabled (e.g., by the detector controller 326) in response to detection of a preamble at operation 404. Operation 416 includes a process of monitoring the stream of received data 306 for a known preamble or synchronization sequence. This operation may be performed by detector 310 on Level 2. Periodically, such as after each received bit, detector 310 tests the received data for the presence of any known sequence. In one embodiment, the incoming data is stored in a register for testing—such as packet buffer 316 or in a dedicated register (not shown). Alternatively, sequences of data may be stored in the detector 310, itself, for testing.

At operation 418, if a preamble having a known synchronization sequence is detected by detector 310 on Level 2, two operations are initiated, including operation 420 and operation 430 (described below). If a known preamble is not detected, the detector 310 returns to operation 416 and continues to monitor incoming data 306 for a known preamble.

At operation 420, in response to recognition of a synchronization pattern and/or preamble of a packet, buffer 316 begins to fill with incoming data 306, similarly to described at operation 406. Because the preamble was recognized, the incoming data is assumed to be a message portion of a body of a packet associated with the recognized preamble. Note that the packet recognized at operation 418 means that a second packet has been recognized. In one example, this means that buffer 314 includes data from both the first and second packets, which will result in a CRC (or similar) failure at validation tester 320. This may result if the second packet began transmission after the first, and was received on a stronger RF signal.

At operation 422, validation tester 322 on Level 2 checks the received data in packet buffer 316 for validity. This may be performed in a manner similar to operation 408. If the values do not match, the data is disregarded or discarded, and the process continues at operation 414. Alternatively, at operation 424, if the validation test indicates a match, then data in packet buffer 316 is processed at packet processor 328.

At operation 426, the system (e.g., controller 326 and/or synchronization detector 312) determines if detector 312 on Level 3 has detected a synchronization pattern in a preamble. If not, then at operation 428 the detector 312 is stopped and/or reset. This prevents multiple levels (e.g., Levels 2 and 3) from simultaneously detecting and responding to the same preamble bit sequence in parallel. In both cases, operation 414 is performed as indicated above, and the process 400 continues at step 402.

Operations taking place on, or influenced by, Level 3 are described by operations 430-438. At operation 430, synchronization detector 312 is enabled (e.g., by the detector controller 326) in response to detection of a preamble at operation 418. Operation 430 includes a process of monitoring of the stream of received data 306 for a known preamble or synchronization sequence. This operation may be performed by detector 312 on Level 3. Periodically, such as after each received bit, detector 312 tests the incoming data for the presence of any known sequence. In one embodiment, detector 312 stores the incoming data to be examined in a register, such as in packet buffer 318, or in a dedicated register (not shown).

At operation 432, if a preamble having a known synchronization sequence is not detected, the detector 312 returns to operation 430 and continues to monitor incoming data 306 for a known preamble. Alternatively, if a preamble is detected, then at operation 434, buffer 318 begins to fill with incoming data 306, similarly as described at operation 420. Because the preamble was recognized, the incoming data is assumed to be a message portion of a body of a packet associated with the recognized preamble. Note that the packet recognized at operation 432 means that a third packet has been recognized. This may mean that three packets are being received simultaneously by the receiver 300, and may indicate that the strength of the RF signal delivering the third packet has corrupted data in the first two packets. In one example, this means that buffer 316 includes data from both the first and second packets, which will result in failure when checked by the validation tester 322. This may result if the third packet began transmission after the second, and was received on a stronger RF signal.

At operation 436, validation tester 324 on Level 3 checks the received data in packet buffer 318 for validity. This may be performed in a manner similar to operation 408. If the values do not match, the data is disregarded or discarded, and the process continues at operation 428. Alternatively, at operation 438, if the validation test indicates a match, then data in packet buffer 318 is processed at packet processor 328.

Example Detector Timing

FIG. 5 is a timing diagram 500 illustrating example aspects of the timing associated with receiver system 300 and method of operation 400. Beginning at time 502, detector 308 of Level 1 begins searching for a bit pattern of a known synchronization pattern in a known preamble (e.g., the monitoring operation 402 of FIG. 4). At time 504, an example data packet begins to arrive. At time 506, detector 308 detects that the arriving data has a known bit pattern (e.g., the detection operation 404 of FIG. 4). Meanwhile, the packet body (or, more precisely, the data presumed to be the packet body) is buffered in packet buffer 314 (e.g., the buffering operation 406 of FIG. 4). And also during this time, an error-detecting algorithm (e.g., a CRC) is performed on data as it is obtained. After the data has fully arrived (e.g. at time 508), the calculated error-detection value may have been compared to a received error-detection value by the validation tester 320 (e.g., the validation operation 408 of FIG. 4).

Meanwhile, at time 506, detector 310 of Level 2 may be enabled (e.g., the monitoring operation 416 of FIG. 4) in response to detection of a preamble on Level 1 (e.g., at operation 404 in FIG. 4). The detector 310 may continue to monitor data on Level 2 until the detector 308 on Level 1 becomes available for monitoring the incoming data stream (e.g., operation 414 of FIG. 4), or until Level 2 detects a known preamble bit sequence (e.g., operation 418 of FIG. 4). In the example timing diagram of FIG. 5, detector 308 on Level 1 may become available after the packet on Level 1 is fully evaluated at time 508.

At time 510, while Level 1 is receiving the packet body portion and while Level 2 is monitoring the incoming data, a new packet arrives. Detector 310 of Level 2 recognizes the bit pattern at time 512 (e.g., at operation 418 of FIG. 4). Accordingly, the remainder of the new packet is buffered (e.g., at operation 420 of FIG. 4) in packet buffer 316 until the end of the packet is reached at time 514. As the data is buffered, an error-detection algorithm (e.g., CRC) is performed on the data (e.g., at operation 422 of FIG. 4 the result of the CRC check is obtained). Starting at time 512, detector 312 is enabled (e.g., at operation 430 of FIG. 4) to monitor the incoming data stream. Detector 312 remains enabled until the earlier of detection of a new preamble sequence, or of Level 2 completing reception of the second packet. The latter situation is exemplified at time 514 in FIG. 5.

A third packet arrives at time 516. Detector 312 recognizes the potential packet at time 518. At time 520, the complete packet has been received and the CRC calculation is completed on Level 3. Optionally, in a receiver system having more than three levels, an additional level can be enabled to monitor the input data stream, such as during the time interval between time 518 and time 520.

In many instances, it is unlikely that all three packets will be successfully validated. For example, the arrival of the second packet during transmission of the first packet may have caused the receiver to capture the bits of the second packet, thereby corrupting reception of the first packet. Similarly, the arrival of the third packet may have caused a capture effect in the receiver to lose reception of the second packet. Accordingly, the receiver may receive and decode only the third packet's transmission. Without the benefit of the multiple levels for sampling the incoming data stream, a single level will have received a portion of the first packet, followed by a portion of the second packet, followed by a portion of the third packet in the time interval during which the single level was attempting to receive the first packet. The starting sequences of the subsequent second and third packets will not have been recognized as such, and will have been presumed by the receiver system to be a part of the first packet.

In some instances, with the benefit of the multiple overlapping levels of receiver system 300, the associated operations 400 and/or the associated event timing 500, if at least one of the overlapping packet transmissions delivers decodable data to the receiver, that data will more likely be received. Moreover, in the event that a message body of a packet includes a bit pattern that coincidentally happens to be the same as a preamble bit pattern, the multiple simultaneous data buffering capability of receiver system 300 will permit the packet to be received. Receiver system 300 enables a higher transmitter-to-receiver ratio in communications systems. For example, in an AMR system, receiver system 300 can enable the use of more utility meter endpoints in a receiving cell, and longer message lengths. Additionally, the use of receiver system 300 can improve the probability of successful communication, which reduces the number of repeat transmissions needed per unit time, which, in turn, increases the battery life of battery-powered transmitters.

In one embodiment of the techniques described herein, each of two data sampling levels (e.g., Level 1 and Level 2) may have a separate sequence detector (e.g., detectors 308, 310), but the two levels share a common unitary packet buffer (e.g., buffer 314) and CRC testing module (e.g., tester 320). This embodiment utilizes the capture effect property in which the latest transmission is most likely to dominate in the receiver. According to an example operation of this embodiment, while a first packet is being received, a second sequence detector monitors the incoming data stream. When a new preamble sequence is recognized by the second sequence detector, the system begins buffering the presumed newly-incoming packet. Advantages of this embodiment include reduced complexity, reduced parts count, and reduced cost. On the other hand, this embodiment may not permit messages having preamble sequences in the packet body to be received, so this embodiment may be useful in communications systems that can control the content of the message portion accordingly.

Example Methods of Message Management

FIG. 6 is a flow diagram illustrating an example method 600 by which a receiver system may manage overlapping messages in a network environment. At operation 602, the communication channel is monitored to detect a synchronization pattern of a first packet. In one example, the monitoring includes recognition of a plurality of different synchronization patterns, which may represent a plurality of different packet types, protocols, etc. In the context of the example of FIG. 3, the detector 308 begins to monitor incoming data from a communications channel detected and/or decoded by the radio 302. The detector 308 watches for a synchronization pattern in data received from the channel. The synchronization pattern may be part of a preamble of a first packet. The synchronization pattern may indicate a protocol that is associated with the packet. In one example, every bit of received data is examined in the context of previously received bits to determine if any of a plurality of known protocols have been received.

At operation 604, in response to detection of a synchronization pattern, data is received, and stored and/or buffered. The data may include a message and/or body portion of a first packet. In the context of the example of FIG. 3, after detection of a synchronization pattern, data associated with a first packet is buffered in a packet buffer 314.

At operation 606, the communication channel is monitored to detect a synchronization pattern of a second packet. In the context of the example of FIG. 3, after detection of a first packet by the synchronization detector 308, and the buffering of data assumed to be part of the first packet in the buffer 314, detector 310 begins to check for a second packet. In one example, transmission of a second packet could be begin during reception of the first packet, causing data associated with one or both of the first and second packets to be corrupted. Thus, it is important to know whether a second packet is being received, and the detector 310 begins to monitor the data that is also being stored in buffer 314 for a synchronization pattern.

At operation 608, a synchronization pattern of a preamble of a second packet may be detected (if present) before validation of the first packet. In the context of the example of FIG. 3, the synchronization detector 310 in Level 2 may detect a synchronization pattern of a second packet before the validation tester 320 has validated the first packet in Level 1.

At operation 610, the received data (e.g., received at operation 604) is validated (if warranted) by a test that will fail if the synchronization pattern of the second packet was detected. That is, the received data of a first packet (on Level 1) may be validated if a second packet did not corrupt the first packet, but will not be validated if the data included (for example) a synchronization pattern of the second packet. In the context of the example of FIG. 3, the validation tester 320 will not validate the data associated with the first packet stored in buffer 314 of Level 1 if a portion of the data in that buffer is not the first packet, but instead includes a portion of the second packet. Thus, while the validation tester 320 tests for data corruption generally, the validation tester 320 may determine if the data in buffer 314 includes part of a second packet (i.e., a packet whose preamble was not that detected by the detector 308).

At operation 612, data not validated by operation 610 is ignored. In the context of the example of FIG. 3, data in buffer 314, which was originally assumed to be part of the first packet, may have been corrupted by reception of a second packet during transmission of the first packet. When the validation tester 320 finds an error, the data in buffer 314 is assumed to be corrupted, and may safely be ignored. The corrupted data may be overwritten as space is needed. In contrast, if the validation tester 320 finds no error, then the first packet was successfully received by Level 1.

At operation 614, a plurality of detectors may be executed in a nested manner, such as by invoking an additional detector and/or "level" in response to each synchronization pattern detected. In the context of the example of FIG. 3, if detector 310 of Level 2 detects a synchronization pattern in a preamble of a packet, the data stored in buffer 316 is also monitored by detector 312 in Level 3. Thus, in a nested or iterative manner, each detected synchronization pattern may invoke a further level of monitoring.

CONCLUSION

Although the subject matter has been described in language specific to structural features and/or methodological acts, it is to be understood that the subject matter defined in the appended claims is not necessarily limited to the specific features or acts described. Moreover, while use of some specific verification techniques have been disclosed (e.g., CRC), such verification techniques should be considered to be representative of more general verification techniques (e.g., error-detection technology) or alternate verification techniques (e.g., such as checksum). Accordingly, the specific features and acts are disclosed as exemplary forms of implementing the claims.

What is claimed is:

1. A method of monitoring a communication channel to receive data packets, each data packet including a preamble having a synchronization pattern and a packet body including a message, the method comprising:

executing a first detector from among a plurality of nested detectors to search for more than one synchronization pattern and to monitor the communication channel to detect a synchronization pattern of a first packet;

receiving data, in response to a detection of the synchronization pattern of the first packet, wherein the received data includes at least a portion of a message of the first packet; and upon detection of the synchronization pattern of the first packet by the first detector, executing a second detector from among the plurality of nested detectors to search for more than one synchronization pattern and to monitor the communication channel and to detect a synchronization pattern of a second packet while the data is received.

2. The method of claim 1, additionally comprising:
detecting a synchronization pattern of a second packet; and
monitoring the communication channel to detect a synchronization pattern of a third packet while buffering the second packet.

3. The method of claim 1, wherein:
a plurality of different synchronization patterns are identified; and
the received data is validated using a test that will fail if the synchronization pattern of the second packet was detected.

4. The method of claim 1, additionally comprising:
receiving at least a portion of the second packet prior to validation of the first packet; and
invalidating the first packet, if either:
a threshold time passes without receipt of a validation portion of the first packet; or
a validation test of the first packet fails.

5. The method of claim 1, additionally comprising:
verifying a validation portion of the first packet; and
processing the message of the first packet in response to the verification.

6. A receiver system for receiving transmitted packets of digital data, comprising:
a receiver circuit that interfaces with a communication channel and converts received transmissions into incoming data;
a multi-level packet detector to monitor the incoming data, the multi-level packet detector comprising:
a first level that includes a first packet identification sequence detector; and
a second level that includes a second packet identification sequence detector; and
sequence detector enabling logic that enables the second packet identification sequence detector to monitor the incoming data in response to a detection by the first packet identification sequence detector of a known packet identification sequence.

7. The receiver system of claim 6, wherein the second packet identification sequence detector monitors the incoming data while the receiver circuit converts the received transmissions into the incoming data.

8. The receiver system of claim 6, wherein the second packet identification sequence detector monitors the incoming data while the first packet identification sequence detector processes the incoming data.

9. The receiver system of claim 6, wherein the multi-level packet detector further comprises:
a first data storage space that receives a first portion of the incoming data in response to the detection by the first packet identification sequence detector of the known packet identification sequence;
wherein the first data storage space receives the first portion of the incoming data concurrently with the monitoring of the incoming data by the second packet identification sequence detector.

10. The receiver system of claim 9, wherein the multi-level packet detector further comprises:
a second data storage space that receives a second portion of the incoming data in response to a detection by the second packet identification sequence detector of a known packet identification sequence;
wherein the first data storage space receives the first portion of the incoming data concurrently with the receiving of the second portion of the incoming data by the second data storage space.

11. The receiver system of claim 6, wherein the incoming data is a stream of serial data.

12. The receiver system of claim 6, wherein the known packet identification sequence is at least a portion of a preamble of a packet of digital data.

13. A method of monitoring a stream of data to receive a data packet among a set of potentially colliding data packets, the method comprising:
monitoring the stream of data with a first detector to identify a potential first data packet having a bit sequence that matches a known bit sequence; and
in response to a recognition of the potential first data packet by a first detector level, monitoring the stream of data with a second detector to recognize a potential second data packet having a bit sequence that matches the known bit sequence.

14. The method of claim 13, wherein the monitoring of the stream of data with a first detector includes comparing bit sequences within the stream of data against a reference bit sequence.

15. The method of claim 13, further comprising:
testing the potential first data packet for validity by applying a verification technique.

16. The method of claim 15, further comprising:
in response to the testing of the potential first data packet for validity, disabling the monitoring with a second detector level if the second detector level has not recognized the potential second data packet since the recognition of the potential first data packet by the first detector level.

17. The method of claim 13, further comprising:
collecting at least a portion of the potential first data packet while monitoring the stream of data with a second detector level.

18. The method of claim 13, further comprising:
monitoring the stream of data with a third detector level in response to a recognition of the potential second data packet by a second detector level.

19. The method of claim 13, further comprising:
in response to a recognition of the potential second data packet by a second detector level, collecting at least a portion of the potential second data packet.

20. The method of claim 13, additionally comprising:
receiving at least a portion of the potential second data packet prior to validation of the potential first data packet; and
invalidating the potential first data packet, if either:
a threshold time passes without receipt of a validation portion of the potential first data packet; or
a validation test of the potential first data packet fails.

* * * * *